United States Patent [19]
Yang

[11] Patent Number: 6,007,199
[45] Date of Patent: Dec. 28, 1999

[54] EYEGLASSES WITH DETACHABLE BOWS

[76] Inventor: Tien Yang, No. 3, Alley 6, Lane 3, Nan-Hsing Rd., Yung-Kang City, Tainan Hsien, Taiwan

[21] Appl. No.: 09/241,577

[22] Filed: Feb. 2, 1999

[51] Int. Cl.$^6$ ...................................................... G02C 1/00
[52] U.S. Cl. .............................................. 351/86; 351/83
[58] Field of Search ................................ 351/83, 86, 44, 351/103, 106, 41, 153, 105

[56] References Cited

U.S. PATENT DOCUMENTS

| 5,592,242 | 1/1997 | Oole | 351/44 |
| 5,903,331 | 5/1999 | Lin | 351/106 |

*Primary Examiner*—Hung Xuan Dang
*Attorney, Agent, or Firm*—Christie, Parker & Hale, LLP

[57] ABSTRACT

A pair of eyeglasses includes an elongated lens unit, a pair of connectors, and a pair of elongated bows. The lens unit has opposite end portions, each of which has an upright lateral edge formed with a positioning notch and is further formed with a positioning hole spaced apart from the upright lateral edge. Each of the connectors has a base portion, and longer and shorter clamping plates which extend from a front end of the base portion and which cooperatively form a receiving groove therebetween for receiving a respective end portion of the lens unit such that the longer clamping plate abuts against a front side face of the lens unit and such that the shorter clamping plate abuts against a rear side face of the lens unit. The receiving groove is provided with a retaining protrusion therein to engage the positioning notch in the respective end portion. The longer clamping plate is provided with a resilient positioning stud which extends releasably into the positioning hole in the respective end portion to engage removably the lens unit. Each of the elongated bows is mounted pivotally on a respective one of the connectors.

8 Claims, 3 Drawing Sheets

EYEGLASSES WITH DETACHABLE BOWS

BACKGROUND OF THE INVENTION

1. Field of the Invention

This invention relates to a pair of eyeglasses, more particularly to a pair of frameless eyeglasses with detachable bows that can be easily assembled to and detached from a lens unit thereof.

2. Description of the Related Art

FIG. 1 illustrates a pair of conventional frameless eyeglasses 1 which includes a unitary lens piece 11, a pair of connectors 12 secured on two opposite ends of the lens piece 11, and a pair of bows 13 mounted pivotally and respectively on distal ends of the connectors 12. The connectors 12 are secured to the lens piece 11 by means of a pair of screws 14.

Since the screws 14 are relatively small, the threading operation of the screws 14 for fastening together the connectors 12 and the lens piece 11 must be conducted with the use of a tool, and is thus relatively time consuming.

When the bows 13 are to be replaced with a new pair of bows, or when the lens piece 11 is to be replaced with a differently colored one, the screws 14 must be unthreaded with the use of a screw driver, and then be threaded again after installation of the new bows or the new lens piece. In addition, the threading and unthreading operation might result in damage to the screws 14 and in wearing of the screw threads on the screws 14. This results in considerable inconvenience to the user.

SUMMARY OF THE INVENTION

Therefore, the object of the present invention is to provide a pair of eyeglasses with detachable bows that can be easily assembled to and detached from a lens unit without the need for using a tool.

Accordingly, the pair of eyeglasses of the present invention includes an elongated lens unit, a pair of connectors, and a pair of elongated bows. The lens unit is adapted to be placed against the face of a wearer to shield the eyes of the wearer. The lens unit has opposite end portions, a rear side face adapted to confront the face of the wearer, and a front side face opposite to the rear side face. Each of the end portions has an upright lateral edge formed with a positioning notch, and is further formed with a positioning hole spaced apart from the upright lateral edge in a lengthwise direction of the lens unit. Each of the connectors has a base portion, longer and shorter clamping plates, and a pivot portion. The longer and shorter clamping plates extend from a front end of the base portion, are spaced apart from each other, and cooperatively form a receiving groove therebetween for receiving a respective one of the end portions of the lens unit such that the longer clamping plate abuts against the front side face of the lens unit and such that the shorter clamping plate abuts against the rear side face of the lens unit. The receiving groove is provided with a retaining protrusion therein to engage the positioning notch in the respective one of the end portions of the lens unit. The longer clamping plate has a projecting section that projects relative to the shorter clamping plate and that is provided with a resilient positioning stud which extends releasably into the positioning hole in the respective one of the end portions to engage removably the lens unit. The pivot portion is provided on a rear end of the base portion. Each of the elongated bows has a pivot end mounted pivotally on the pivot portion of a respective one of the connectors, and an ear support end adapted for hanging on one of the ears of the wearer.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
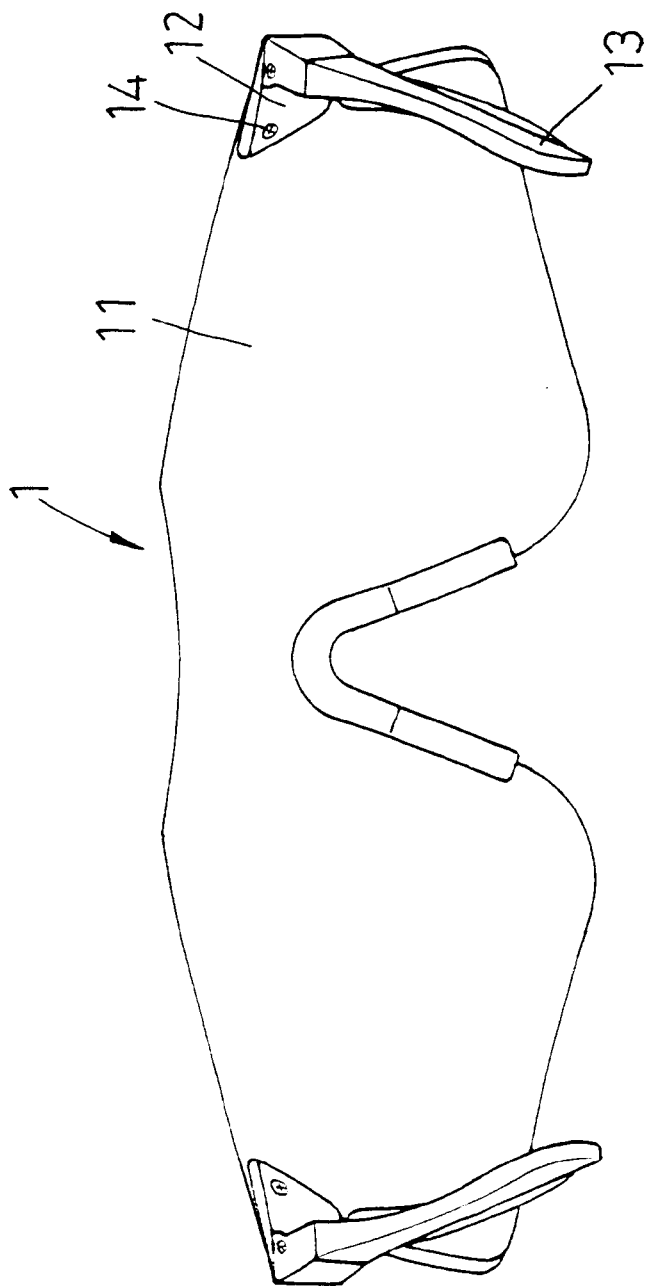
FIG. 1 is a rear side perspective view of a pair of conventional eyeglasses.
Figure 2:
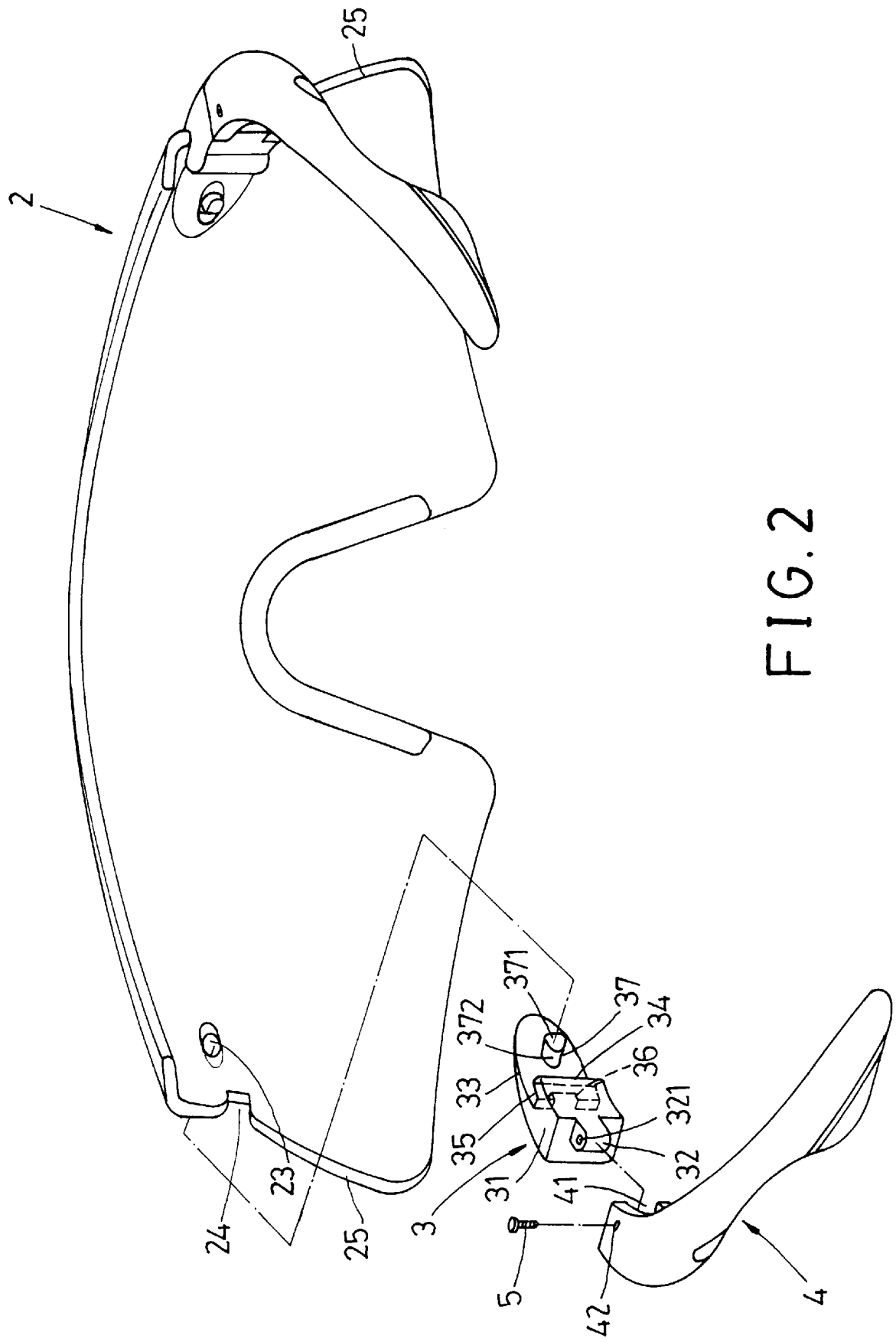
FIG. 2 is a partly exploded perspective view of a preferred embodiment of a pair of eyeglasses according the present invention.
Figure 3:
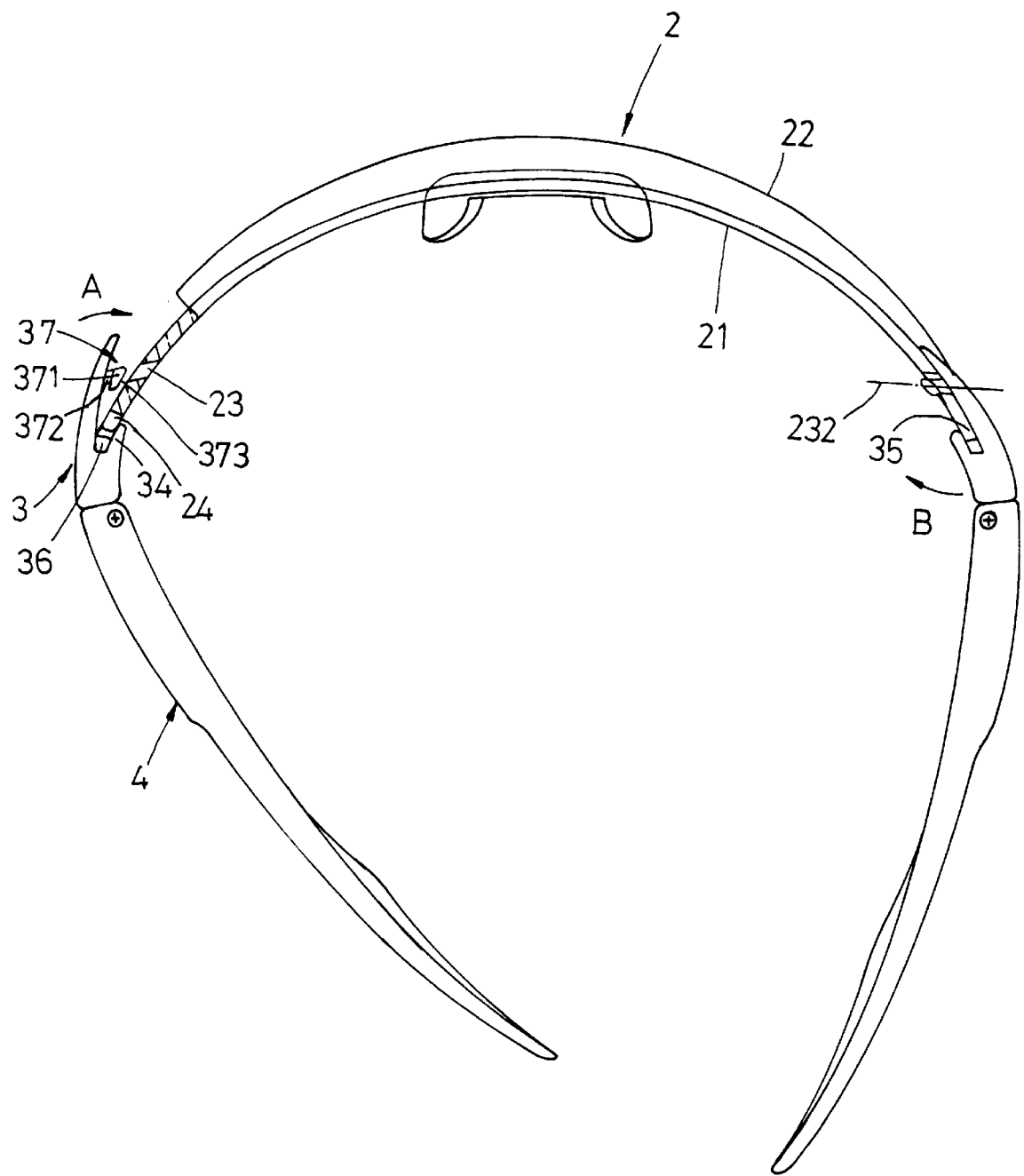
FIG. 3 is a top view of the pair of eyeglasses of the preferred embodiment, illustrating how a connector engages a lens unit thereof.

Referring to FIGS. 2 and 3, the pair of eyeglasses of the preferred embodiment according to the present invention is shown to be in the form of a pair of frameless eyeglasses, and includes an elongated lens unit 2, a pair of connectors 3, and a pair of elongated bows 4.

The lens unit 2 is formed as a unitary lens piece, and is adapted to be placed against the face of a wearer to shield the eyes of the wearer. The lens unit 2 has a curved cross-section along a horizontal plane, a generally concave rear side face 21 adapted to confront the face of the wearer, a generally convex front side face 22 opposite to the rear side face 21, and opposite end portions that extend rearwardly. Each of the end portions has an upright lateral edge 25 formed with a rectangular positioning notch 24, and is further formed with a positioning hole 23 spaced apart from the upright lateral edge 25 in a lengthwise direction of the lens unit 2. Each positioning hole 23 has an axis 232 disposed along a chord direction that extends between the end portions of the lens unit 2. The axes 232 are inclined relative to a radial line passing through the front and rear side faces 22, 21 in the thickness direction, and are symmetrical with respect to a radial central line that divides the lens unit 2.

Each of the connectors 3 is formed integrally from a resilient material, and has a base portion 31, longer and shorter clamping plates 33, 34 extending forwardly from an end face of a front end of the base portion 31, and a pivot projection 32 formed on a rear end of the base portion 31. The pivot projection 32 is formed with a pivot hole 321 with a vertical axis. The longer and shorter clamping plates 33, 34 have a curvature generally corresponding to that of the lens unit 2. The longer and shorter clamping plates 33, 34 are spaced-apart from each other to cooperatively define a receiving groove 35 therebetween for receiving a respective one of the end portions of the lens unit 2 such that the longer clamping plate 33 abuts against the front side face 22 of the lens unit 2 and such that the shorter clamping plate 34 abuts against the rear side face 21 of the lens unit 2. The receiving groove 35 is provided with a retaining protrusion 36 therein to engage the positioning notch 24. The shorter clamping plate 34 has a distal end that projects beyond the retaining protrusion 36 relative to the end face at the front end of the base portion 31. The longer clamping plate 33 has a projecting section that projects relative to the shorter clamping plate 34 and that has an area sufficient to cover the positioning hole 23 in the respective one of the end portions of the lens unit 2. The projecting section of the longer clamping plate 33 is formed with a resilient positioning stud 37 that extends in a direction toward the shorter clamping plate 34 for engaging the positioning hole 23 in the respective one of the end portions of the lens unit 2. The positioning stud 37 includes a shank portion 372 with a fixed end secured to the longer clamping plate 33 and a distal end, and an enlarged head portion 371 which is formed on the distal end of the shank portion 372 and which is slightly larger than the positioning hole 23. The head portion 371 has a guiding face 373. The positioning stud 37 is inclined relative to the longer clamping plate 33 such that the positioning stud 37 can be axially aligned with the respective positioning hole 23 while being extended into the positioning hole 23 from the front side face 22 to the rear side face 21. This facilitates extension of the positioning stud 37 into the positioning hole 23. The enlarged head portion 371 of the positioning stud 37 deforms when the shank portion 372 passes through the positioning hole 23 for eventual engagement with the rear side face 21 of the lens unit 2.

Each of the bows 4 has a pivot end formed with a recess 41 which opens toward the pivot projection 32 of a respective one of the connectors 33 and toward the other one of the bows 4 for receiving the pivot projection 32. The pivot end is formed with threaded holes 42 that are aligned with the pivot hole 321 in the pivot projection 32. A screw 5 extends through the threaded holes 42 and the pivot holes 321 to engage threadedly the pivot end of the respective one of the bows 4 and to permit pivoting of the respective one of the bows 4 toward and away from the other one of the bows 4 about an axis of the screw 5. Each of the bows 4 further has an ear support end adapted for hanging on one of the ears of the wearer.

To assemble a respective one of the connectors 3 to the lens unit 2, the connector 3 is placed adjacent to a respective one of the lateral edges 25 of the lens unit 2 such that the receiving groove 35 in the connector 3 opens in a direction toward the lateral edge 25 and such that the retaining protrusion 36 in the receiving groove 35 is registered with the positioning notch 24 on the respective lateral edge 25. The respective end portion of the lens unit 2 is then extended into the receiving groove 35 to permit the retaining protrusion 36 to extend into the positioning notch 24. Thereafter, the connector 3 is forced to move in a direction (A) shown in FIG. 3. At this time, since the positioning stud 37 is aligned with the positioning hole 23, and since the positioning stud 37 has a deformable and enlarged head portion 371, the positioning stud 37 is guided by the guiding face 373 and is allowed to pass through the positioning hole 23 in the respective end portion such that the enlarged head portion 371 eventually engages the rear side face 21 of the lens unit 2.

Due to the engagement between the lateral edge 25 and the receiving groove 35, the engagement between the positioning notch 24 and the retaining protrusion 36, and the engagement between the positioning stud 37 and the positioning hole 23, the connector 3 can engage tightly the respective end portion of the lens unit 2.

To detach the connector 3 from the respective end portion of the lens unit 2, the connector 3 is simply moved in an opposite direction (B). The enlarged head portion 371 of the positioning stud 37 deforms again to permit the positioning stud 37 to pass through the positioning hole 23 in an opposite direction for removal from the lens unit 2. At this time, the retaining protrusion 36 of the connector 3 can be disengaged from the positioning notch 24, and the respective lateral edge 25 can be disengaged from the receiving groove 35 of the connector 3.

It has thus been shown that the connectors 3, together with the bows 4 connected thereto, can be easily assembled to and detached from the lens unit 2. The operation of threading and unthreading a screw with the use of a tool is obviated. This results in significant advantages, including savings in manufacturing costs and added convenience when replacing the bows 4 or the lens unit 2.

With this invention thus explained, it is apparent that numerous modifications and variations can be made without departing from the scope and spirit of this invention. It is therefore intended that this invention be limited only as indicated in the appended claims.

I claim:

1. A pair of eyeglasses, comprising:
   an elongated lens unit adapted to be placed against the face of a wearer to shield the eyes of the wearer, said lens unit having opposite end portions, a rear side face adapted to confront the face of the wearer, and a front side face opposite to said rear side face, each of said end portions having an upright lateral edge formed with a positioning notch, each of said end portions being further formed with a positioning hole spaced apart from said upright lateral edge in a lengthwise direction of said lens unit;
   a pair of connectors, each of which has
      a base portion with front and rear ends,
      longer and shorter clamping plates extending from said front end of said base portion, said longer and shorter clamping plates being spaced apart from each other and cooperatively forming a receiving groove therebetween for receiving a respective one of said end portions of said lens unit such that said longer clamping plate abuts against said front side face of said lens unit and such that said shorter clamping plate abuts against said rear side face of said lens unit, said receiving groove being provided with a retaining protrusion therein to engage said positioning notch in the respective one of said end portions of said lens unit, said longer clamping plate having a projecting section that projects relative to said shorter clamping plate and that is provided with a resilient positioning stud which extends releasably into said positioning hole in the respective one of said end portions to engage removably said lens unit, and
      a pivot portion provided on said rear end of said base portion; and
   a pair of elongated bows, each having a pivot end mounted pivotally on said pivot portion of a respective one of said connectors, and an ear support end adapted for hanging on one of the ears of the wearer.

2. The pairs of eyeglasses as claimed in claim 1, wherein said positioning stud on each of said connectors includes a shank portion having a fixed end secured to said longer clamping plate and a distal end, and an enlarged head section formed on said distal end of said shank section, said shank section having a size sufficient to pass through said positioning hole in the respective one of said end portions, said enlarged head section being slightly larger than said positioning hole and being deformable when said shank section passes through said positioning hole for eventual engagement with said rear side face of said lens unit.

3. The pair of eyeglasses as claimed in claim 2, wherein each of said connectors is formed integrally from a resilient material.

4. The pair of eyeglasses as claimed in claim 1, wherein said lens unit has a curved cross-section along a horizontal plane such that said front side face is generally convex, said rear side face is generally concave, and said end portions extend rearwardly.

5. The pair of eyeglasses as claimed in claim 4, wherein each of said positioning holes has an axis disposed along a chord line that extends between said end portions of said lens unit to facilitate extension of said positioning stud therethrough in a direction from said front side face to said rear side face.

6. The pair of eyeglasses as claimed in claim 5, wherein each of said longer and shorter clamping plates extends from an end face of said front end of said base portion, said shorter clamping plate of each of said connectors having a distal edge that projects beyond said retaining protrusion relative to said end face of said front end of said base portion.

7. The pair of eyeglasses as claimed in claim 4, wherein said lens unit includes a unitary lens piece with said positioning notches and said positioning holes formed directly thereon.

8. The pair of eyeglasses as claimed in claim 1, wherein said projecting section of said longer clamping plate has an area sufficient to cover said positioning hole in the respective one of said end portions of said lens unit.

* * * * *